(12) United States Patent
Grothues (10) Patent No.: US 9,807,159 B2
(45) Date of Patent: Oct. 31, 2017

(54) ALLOCATION OF VIRTUAL MACHINES IN DATACENTERS

(75) Inventor: Ingo Grothues, Münster (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 580 days.

(21) Appl. No.: 14/119,600

(22) PCT Filed: May 13, 2011

(86) PCT No.: PCT/EP2011/057756
§ 371 (c)(1),
(2), (4) Date: Mar. 10, 2014

(87) PCT Pub. No.: WO2012/155947
PCT Pub. Date: Nov. 22, 2012

(65) Prior Publication Data
US 2014/0215076 A1    Jul. 31, 2014

(51) Int. Cl.
G06F 15/173    (2006.01)
H04L 29/08    (2006.01)
G06F 9/455    (2006.01)
G06F 9/50    (2006.01)

(52) U.S. Cl.
CPC .......... *H04L 67/1008* (2013.01); *G06F 9/455* (2013.01); *G06F 9/505* (2013.01)

(58) Field of Classification Search
CPC .............. H04L 29/08144; H04L 29/06; H04L 29/08072; H04L 29/08171
USPC ........................................ 709/226
See application file for complete search history.

(56) References Cited

U.S. PATENT DOCUMENTS

| 7,904,540 B2 | 3/2011 | Hadad et al. |
| 8,719,415 B1* | 5/2014 | Sirota ................... G06F 9/5061 709/221 |
| 2004/0268347 A1* | 12/2004 | Knauerhase ........ G06F 9/45533 718/1 |
| 2007/0271560 A1 | 11/2007 | Wahlert et al. |
| 2008/0155537 A1* | 6/2008 | Dinda ................... G06F 9/4887 718/1 |
| 2008/0270199 A1* | 10/2008 | Chess ..................... G06F 9/505 705/7.26 |

(Continued)

FOREIGN PATENT DOCUMENTS

| CN | 101449258 A | 6/2009 |
| CN | 101504620 A | 8/2009 |
| CN | 101593133 A | 12/2009 |

OTHER PUBLICATIONS

International Search Report, PCT Application No. PCT/EP2011/057756, dated Sep. 16, 2011.

(Continued)

*Primary Examiner* — Alan S Chou
(74) *Attorney, Agent, or Firm* — Sage Patent Group (57) ABSTRACT

A method of operating a datacenter comprising a plurality of hosts coupled by a network, the hosts being configurable to run a plurality of virtual machines, the method comprising: collecting network load information indicating a load of the network; determining a target allocation of one of the virtual machines at one of the hosts based on the collected network load information; and allocating the one virtual machine at the one host based on the determined target allocation.

20 Claims, 5 Drawing Sheets

(56) References Cited

U.S. PATENT DOCUMENTS

2010/0027420 A1    2/2010  Smith

OTHER PUBLICATIONS

Written Opinion of the International Searching Authority, PCT Application No. PCT/EP2011/057756, dated Sep. 16, 2011.
International Preliminary Report on Patentability, PCT Application No. PCT/EP2011/057756, dated Aug. 19, 2013.
Sonnek et al., "Starling: Minimizing Communication Overhead in Virtualized Computing Platforms Using Decentralized Affinity-Aware Migration", *2010 39$^{th}$ International Conference on Parallel Processing*, IEEE Computer Society, Sep. 13-16, 2010, pp. 228-237.
Office Action, Chinese Application No. 201180072216.3, dated Feb. 2, 2016.
VMware, Inc., Product Datasheet—"VMware Distributed Resource Scheduler (DRS)—Dynamic Load Balancing and Resource Allocation for Virtual Machines", downloaded from http://www.vmware.com/files/pdf/VMware-Distributed-Resource-Scheduler-DRS-DS-EN.pdf, 2009, 3 pp.
VMware, Inc., Product Datasheet—"VMware VMotion—Live Migration for Virtual Machines Without Service Interruption", downloaded from http://www.vmware.com/files/pdf/VMware-VMotion-DS-EN.pdf, 2009, 2 pp.

\* cited by examiner

ALLOCATION OF VIRTUAL MACHINES IN DATACENTERS

CROSS REFERENCE TO RELATED APPLICATION

This application is a 35 U.S.C. §371 national stage application of PCT International Application No. PCT/EP2011/057756, filed on 13 May 2011, the disclosure and content of which is incorporated by reference herein in its entirety. The above-referenced PCT International Application was published in the English language as International Publication No. WO 2012/155947 A1 on 22 Nov. 2012.

TECHNICAL FIELD

The present invention relates to a method of operating a datacenter. More specifically, the present invention relates to determining a target allocation of one of a plurality of virtual machines to one of a plurality of hosts. The present invention further relates to a datacenter entity, a program comprising instruction code configuring a processing unit of a datacenter entity, and to a system for use in at least one datacenter.

BACKGROUND

Datacenters are a collection of computers linked to each other by means of a network so as to collectively provide computing power. In the context of datacenters, or equally: cloud computing, the computers are called hosts. The hosts can be stand-alone computers, such as personal computers, or so-called "server blades" which are usually single board computers that fit in large numbers in a common mounting rack so that a plurality of such server blades are arranged next to each other. A datacenter can be located at one location, such as a room or a building, but may also be well distributed over several locations, so that hosts in different rooms, buildings, and places act as one datacenter.

In datacenters or cloud computing environments that make use of virtualization, the so-called virtual machines (VM) are the basic resource containers in order to offer resources to an operating systems (OS) running on such a virtual machine. The resources of a virtual machine can be used like those of a real physical machine.

In practice, multiple VMs can run co-located on one physical machine, i.e. on one host. Correspondingly, these co-located VMs are sharing the CPU, memory and hardware devices of their host. Access to the physical hardware is managed by a software instance which is usually called the "hypervisor". With the help of hypervisors, VMs can be moved to other hosts in a networked datacenter during runtime, which is called (live-) migration of a VM. In other words, a VM and can be re-located in a running state without disturbing its running applications Existing solutions like VMware™ DRS (cf. http://www.vmware.com/products/drs/) offer an automatic placement of VMs onto hosts with a strategy that considers hardware resource demands (e.g. CPU or memory). In order to keep resource usage as balanced as possible, VMs are usually placed more or less equally over the whole datacenter. Also, dynamic re-location can be activated which may move VMs from one host to another if their resource demands (CPU or memory) change during runtime and are better satisfied by another VM/host mapping.

However, VMs are not to be seen as stand-alone processing entities, since several VMs may be communicate with each other so as to execute some common task(s). For example, one VM may run a webserver application, whereas another VM may run a content server application. The webserver may control access to the content handled by the content server. As a consequence, there may be significant data exchange between the two servers, i.e. between the two respective VMs.

The problem with existing allocation/re-location solutions is that they do not consider communication relations and network load between VMs. They evaluate local indicators only (e.g. CPU load, memory usage, etc.) and look at each host independently. This results in an inefficient usage of the network resources that are available in a datacenter. Following the above example, the allocation of the VMs running the webserver and the content server, respectively, has significant impact on network load, network and datacenter performance, and also energy consumption.

There is correspondingly a need for an improved mechanism of allocating virtual machines on hosts of a datacenter. It is thus an object of the present invention to provide an improved method of operating a datacenter, an improved datacenter entity, an improved program comprising instruction code configuring a processing unit of a datacenter entity, and an improved system for use in at least one datacenter.

SUMMARY

The above-mentioned objects are met by the subject-matter of the independent claims. Further preferred embodiments are defined in the dependent claims.

According to an aspect of the present invention, there is provided a method of operating a datacenter comprising a plurality of hosts coupled by a network, the hosts being configurable to run a plurality of virtual machines, the method comprising: collecting network load information indicating a load of the network; determining a target allocation of one of the virtual machines at one of the hosts based on the collected network load information; and allocating the one virtual machine at the one host based on the determined target allocation.

According to another aspect of the present invention, there is provided a datacenter entity comprising a processing unit, said processing unit being configured to generate a network load profile based on network load information indicating load of a network coupling a plurality of hosts; and determine a target allocation of a virtual machine at one of the hosts based on the network load profile.

According to another aspect of the present invention, there is provided a program comprising instruction code, said code configuring a processing unit of a datacenter entity of one of the embodiments of the present invention.

According to yet another aspect of the present invention, there is provided a system for use in at least one datacenter comprising a plurality of hosts coupled by a network, the system comprising a datacenter entity of one of the embodiments of the present invention and at least one collecting entity configured to collect said network load information.

BRIEF DESCRIPTION OF THE DRAWINGS

Embodiments of the present invention, which are presented for better understanding the inventive concepts but which are not to be seen as limiting the invention, will now be described with reference to the Figures in which.

DETAILED DESCRIPTION

Figure 1:
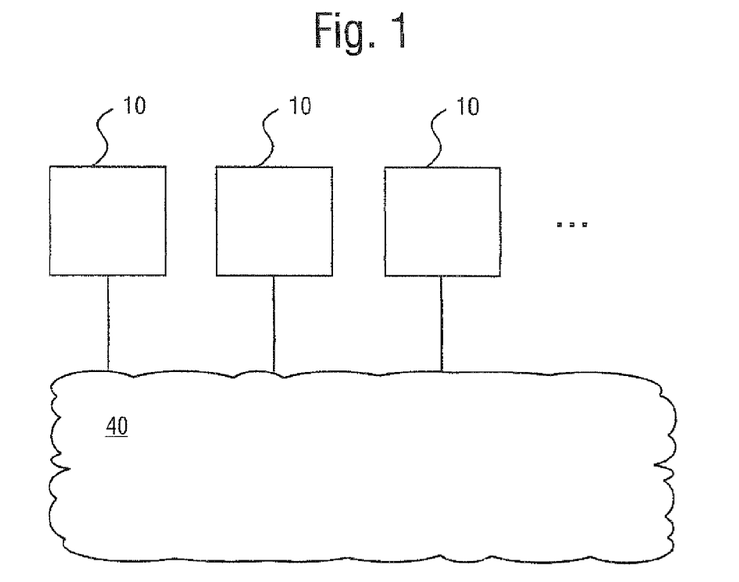
FIG. 1 shows a schematic view of the basic configuration of datacenter.

The basic configuration of a datacenter and the constituting hosts is shown and explained with reference to FIGS. 1 and 2. In a datacenter, a plurality of hosts 10 are coupled to each other by a network 40. The network 40 allows for data exchange amongst the hosts 10 and other external entities, such as control and management entities, internal networks and/or the internet.

Figure 2:
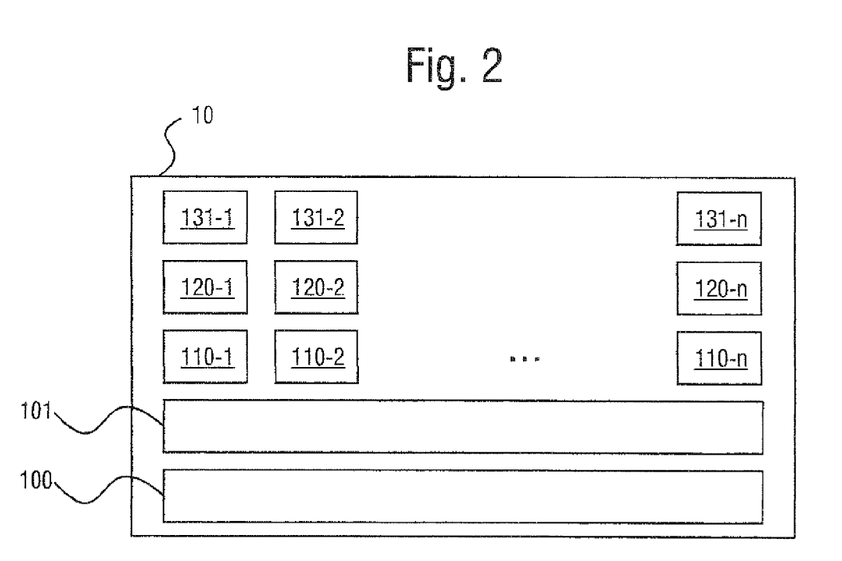
FIG. 2 shows a schematic view of the basic configuration of host running one or more virtual machines.

With now specific reference to FIG. 2, one host 10 may run one or more virtual machines (VM). Correspondingly, the co-located VMs 110-1 . . . n share the physical resources 100 of the host 10, e.g. the CPU, memory, and hardware devices of the host. Access to the physical resources 100 is managed by a resource management instance 101 which is usually implemented as software and called "hypervisor". As already explained, the resource management instance 101 allows for moving VMs 110-1 . . . n to other hosts in a networked datacenter.

Each VM 110-1 . . . n runs an operating system (OS) In turn, at least one application 131-1 . . . n runs on the respective OS 120-1 . . . n. As usual, many more than one application 131-1 . . . n may run on the OS 120-1 . . . n of the VM Examples of applications 131-1 . . . n include server applications, processing applications, computing application, and office applications such as word processing, spreadsheet calculation, and database applications. Further, also profile creator functions and/or profile evaluator functions as the will be described in greater detail below may be implanted as such applications.

Figure 3A:
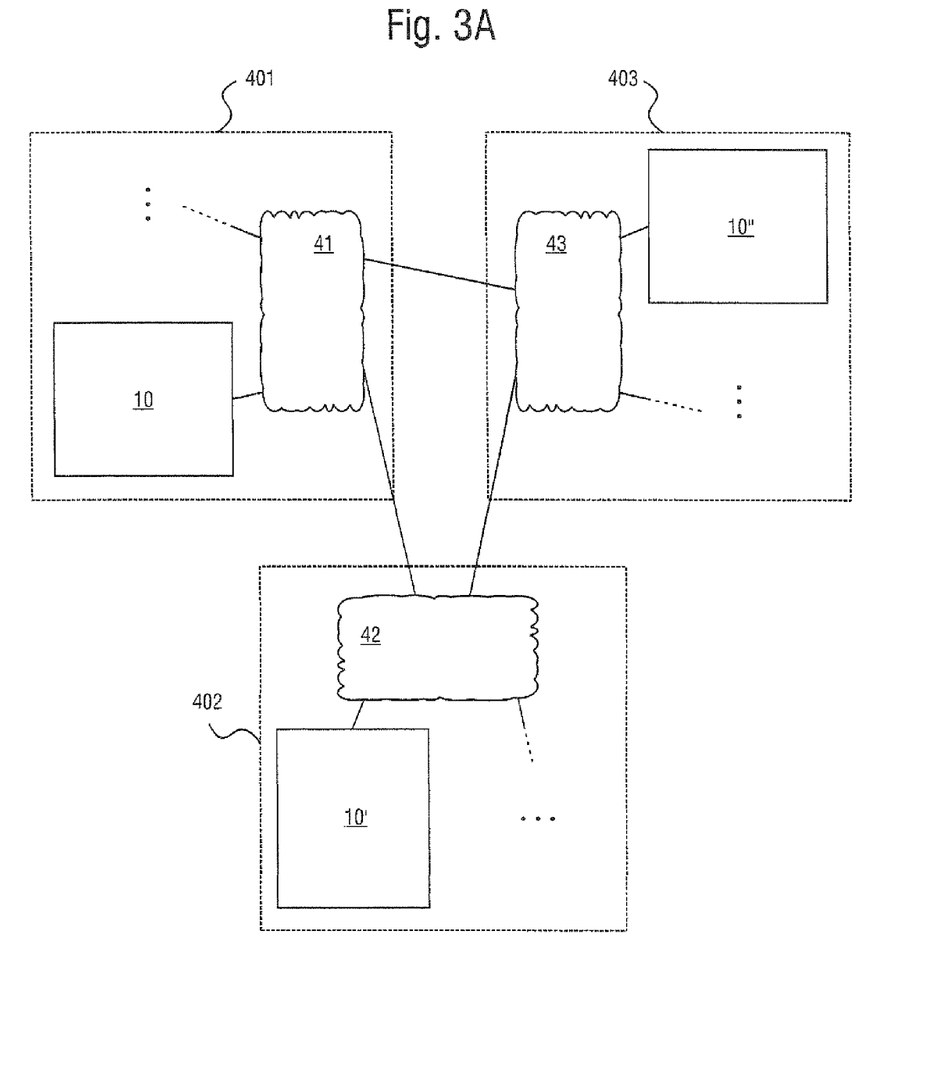
FIGS. 3A to 3C show schematic views of a configuration of a datacenter according to embodiments of the present invention.

FIG. 3A shows a schematic view of a configuration of a datacenter according to an embodiment of the present invention. In this configuration, a datacenter comprises areas 401, 402, and 403. These areas each comprise hosts 10, 10', and 10" that are, respectively, coupled by area networks 41, 42, 43. These area networks 41, 42, 43 are, in turn, coupled to each other so as to exchange data. Thus, in a sense, the area networks 41, 42, and 43 combined may constitute "the" network in the sense of other embodiments of the present invention.

The concept of areas 401, 402, and 403 takes into consideration the possibility that datacenters can be organized and/or managed by introducing sub-entities, such as the areas, or also that datacenters can be spatially distributed. As far as the latter is concerned, datacenter need not to be confined to a single room, building or location: The area networks 41, 42, 43 may couple only a sub-group of hosts of the datacenter that are located at some common location. The links between two area networks 41, 42, 43 may then provide communication amongst the areas 401, 402, and 403 so as to form one datacenter albeit the constituting hosts being distributed and spread among various locations.

Figure 3B:
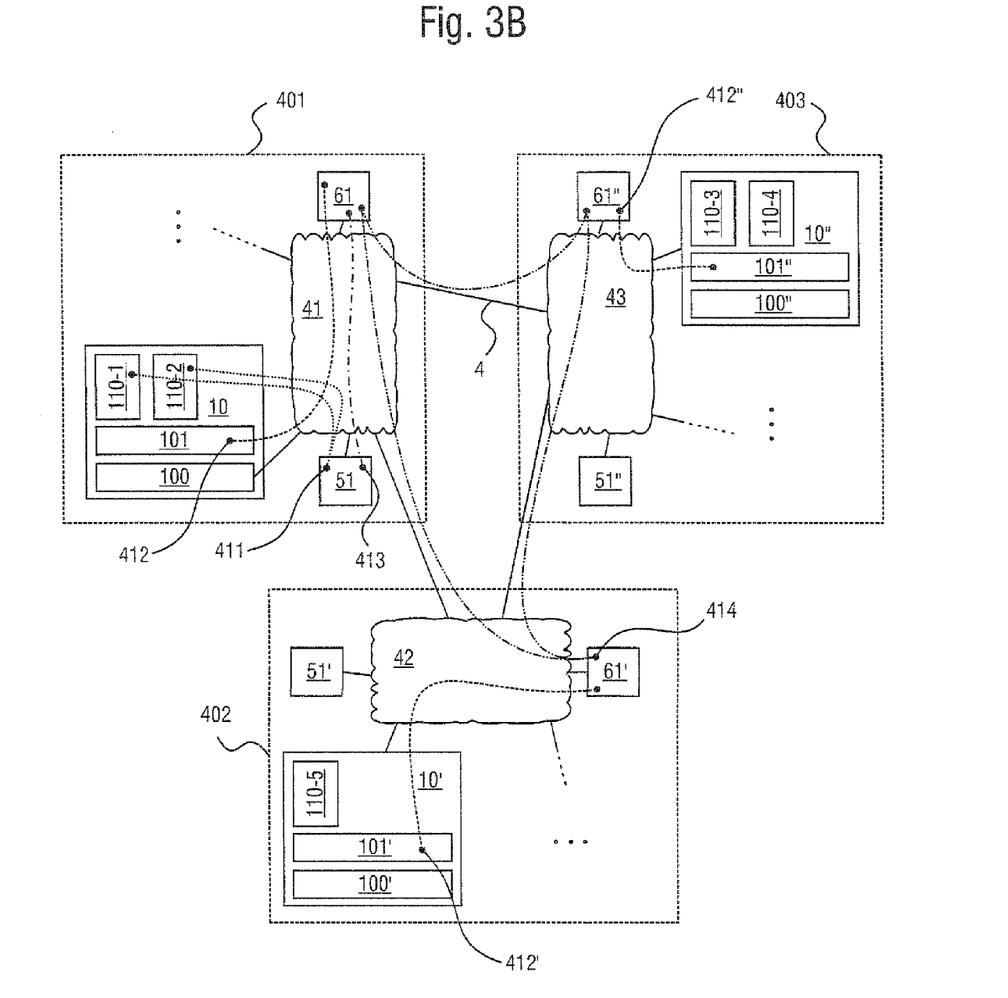

FIG. 3B shows a schematic view of a configuration of a datacenter according to another embodiment of the present invention. According to this embodiment a concept for automatic creation and evaluation of network communication profiles for virtual machines in introduced. This may enable an optimal mapping of VMs onto hosts, above all, when the network(s) are heterogeneous environments with different performance capabilities in and between different areas 401, 402, and 403.

FIG. 3B shows some initial situation/configuration of a datacenter as already introduced in conjunction with FIG. 3A. This exemplary configuration is such that at least five virtual machines 110-1 to 110-5 run on the hosts 10, 10', and 10", which are, respectively, located in different areas 401, 402, and 403. For the sake of clarity, the depiction of operating systems and applications is omitted. However, it is to be understood that the virtual machines 110-1 to 110-5 run at least one OS that, in turn, run at least one application (cf. FIG. 2).

According to this embodiment, a distributed runtime environment for VMs 110-1 to 110-5 is provided to create and evaluate network communication profiles for its VMs with the goal of finding an optimal mapping of VMs to the areas 401, 402, and 403, or to specific hosts of these areas. Specifically, the areas 401, 402, and 403 may feature different performance capabilities', above all, with respect to network performance and load capabilities. As will be now explained, such a distributed runtime environment for the VMs 110-1 to 110-5 can lead to more effective usage of communication resources (i.e. network and/or area networks), thereby increasing the performance of the system and the datacenter as a whole.

For the above purpose, several logical functions and topologies are introduced. First, profile creator functions 51, 51', 51" are implemented for each area 401, 402, and 403, being coupled to the respective area networks 41, 42, and 43. Said profile creator functions 51, 51', 51" look at network data flows of the VMs belonging to respective host and/or area. For example, the profile creator function 51 collects information on network data flow of the virtual machines 101-1 and 101-2 running on host 10. This may be rendered possible by linking the profile creator function 51 to the host 10 by the area network 41.

The profile creator function 51 (just as the other the profile creator functions 51' and 51") collects information about the network data flow including information on the respective data destinations and their throughputs. Said information may, for example, be held as figures relating to data flow in terms of bytes or packets per second. The profile creator function 51 may also collect additional load indicators for the VMs related to the use of the resources 101, such as CPU load and memory usage. The so-collected information enables dynamic creation of VM communication and load profiles, which constitute summaries of the collected information suitable for later forwarding, processing, and evaluation. The generation of these communication and load profiles may be effected by the profile creator functions 51, 51', and 51" for all the virtual machines running on hosts of one specific network area or only for a limited and/or selected number of hosts/areas.

Secondly, profile evaluator functions 61, 61', 61" are implemented in each area 401, 402, and 403, being also coupled to the respective area networks 41, 42, and 43. Said profile evaluator functions 61, 61', 61" perform evaluation of the profiles provided by profile creator functions 51, 51', and 51" for deciding whether or not a re-location of one or more VMs 110-1 to 110-5 leads to a better overall network performance. For this purpose, the profile evaluator functions 61, 61', 61" may take into consideration the available maximum resources in the area they are responsible for (e.g. area 403 for function 61").

For said evaluation and decision process the profile evaluator functions 61, 61', 61" may evaluate or exchange profiles from or with other profile evaluator functions 61, 61', 61". This may be rendered possible by an evaluation interface 414 being implemented by the area networks 41, 42, and 43, and the respective network links 4 in between these area networks. As a result, a profile evaluator function 61, 61', 61" is not limited to the respective hosts it is currently responsible for, but can consider all available network areas and hosts for evaluation and a possible re-location of a VM 110-1 . . . 5 to a target allocation. In other words, the profile evaluator functions 61, 61', 61" cooperate in order to find the optimum VM allocation in the datacenter by means of a cooperative evaluation and determination process. The mentioned cooperation may be effected by one of the functions being selected as a master function so as collect all profiles and in the sense of a highest instance determine any needs for re-locations and/or specific allocations.

For each network area 401, 402, and 403, there is at least one host 10, 10', and 10". Further, each network area 401, 402, and 403 has associated one profile creator function 51, 51', and 51" and one profile evaluator functions 61, 61', 61".

Note that one single host may be represented by a network area and that the functions 51, 61, 51', 61', 51", and 61" may also be implemented in another area than the area it is responsible for (i.e. the area for which it collects and/or evaluates profiles).

In practice, all network traffic coming from or going to a VM inside an area can be monitored by the associated profile creator functions 51, 51', and 51". Such monitoring can be implemented "directly" on each of VM's network interface or "indirectly" on the link(s) carrying the aggregated traffic of all VMs of an area 401, 402, 403. Preferably, the profile creator functions 51, 51', and 51" and the profile evaluator functions 61, 61', 61" may be implemented on separate hardware, so as to avoid any slow down of the hosts as such while analyzing the network traffic load. Further, as far as the identification of the VMs 110-1 . . . 5 is concerned, it can be relied upon their respective network addresses, or preferably, upon their MAC addresses which are pseudo-hardware addresses that are usually unique in one network environment.

Besides the already introduced evaluation interface 414 there may be implemented other interfaces for collection and transfer of communication profile data. In all, there may be involved four interfaces as explained in the following:

A collect interface 411 is employed by the profile creator functions 51, 51', and 51" for collecting load measurements, network flow destinations or other data that should be considered for profile creation. The exact implementation of the collect interface 411 may depend on the kind of data source that is employed, e.g. data collector routines implemented as applications and running on the VM's OS or acquisition routines implemented on lower protocol levels. The function side of the interface 411 can request a numeric value such as sent/received packets or bytes per second, destination and source IP addresses, CPU load and memory usage.

A transfer interface 413 provides transmission of the profile data of virtual machines from the profile creator functions 51, 51', and 51" to the respective profile evaluator functions 61, 61', 61" of the network area. For example, in network area 401, the profile creator function 51 transmits the profile data via the transfer interface 413 to the respective profile evaluator function 61.

The evaluation interface 414 has already been introduced as the interface that allows for the profile evaluator functions 61, 61', 61" to contact each other in order to cooperatively evaluate VM profiles and to decide whether a re-location of a VM should be triggered or not.

Further, an instruction interface 412 serves for contacting the hypervisors 101', 101", and 101", for example, for initiating and effecting a re-location of a VM 110-1 . . . 5 from one host to another. If the profile evaluator functions 61, 61', 61" have decided to move a VM to another host, the interface 412 is used to contact the corresponding hypervisor of the VM and to request its movement. As an example, the re-location of VM 110-5 from host 10' to host 10" (cf. FIG. 3C) may be effected by instructing hypervisors 101' and 101" by respective instruction interfaces 412' and 412".

According to embodiments of the present invention, The VM communication and load profiles may be based on values which can be measured on or requested from different parts in the system: Inside a VM or in its operating system respectively, with the help of measurement or data collection software (e.g. an application running on a VM's OS); on the hypervisor by installing measurement or data collection software and/or reading data from interfaces provided by the hypervisor; and on nodes of the network (network nodes) by mirroring traffic to a dedicated measurement/analyzer node and/or reading data from interfaces provided by network nodes (e.g. switches).

From these sources the following data can be collected: Bytes and packets sent per second by a VM over the network; destination and source addresses of the VM's network flow endpoints; CPU maximum performance (MHz) and current system load (percent); memory maximum (MB) and current usage (percent); an other values (e.g. hard disk I/O usage and many more).

By measuring these data periodically (e.g. every 3 seconds) a network profile can be created containing information like: Current network load; network load tendencies/prediction by comparing with preceding values (e.g. last 10 sec for short term tendency, 10 min for long term tendency); number of active network flows; graph with communication partners (graph nodes), network flows (graph links) network load strength as link weight (as triplet with tendencies); current CPU load; and current memory usage.

The profile data can be read by the profile evaluator functions 61, 61', 61", while certain events may also be configured to let the profile creator functions 51, 51', and 51" inform the profile evaluator functions 61, 61', 61" asynchronously about special events such as drastic value changes. In other words, the above figures may be continuously, or in intervals, compared to predetermined threshold values so as to identify events. Further, by comparing the last profile sequence of a VM with its stored history profiles, a pattern recognition algorithm may predict future behavior of the VM by recognition of previously observed system behavior. This may give additional information for better VM re-location/allocation decisions.

In general, the evaluation of the VM profiles by the profile evaluator functions 61, 61', 61"—individually or cooperatively—may pursue several goals including the optimization of the network performance by co-locating VM groups with high network load in high performance areas and ensuring not to overload the resources of an area by keeping track of hardware resource availability (e.g. CPU, memory, etc.).

Figure 3C:
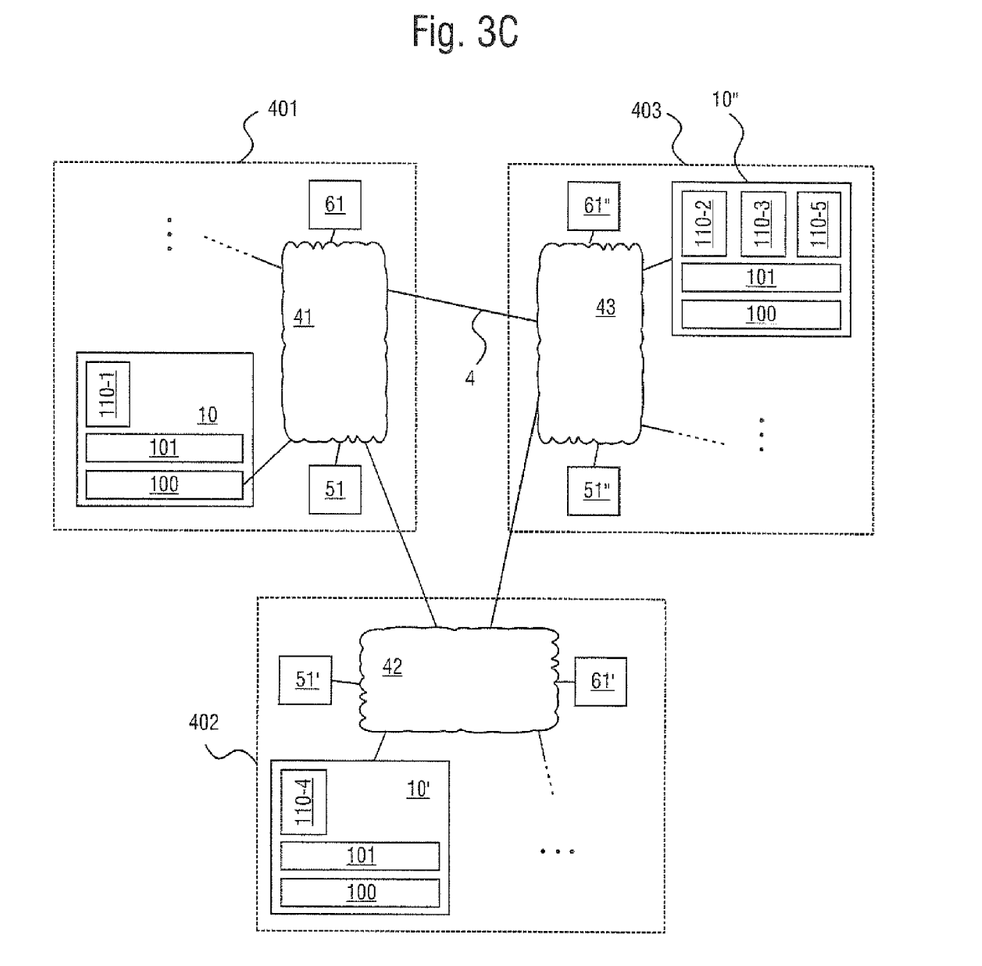

At least one of the above goals is met when operating a datacenter as shown in FIG. 3C as compared to the situation shown in FIG. 3B. The latter shows, as an example, a somewhat suboptimal initial state (configuration), whereas embodiments of the present invention lead to an optimized result by means of profile evaluation and corresponding allocation as shown in FIG. 3C.

The example scenario shows the three network areas 401, 402, and 403, where it is assumed that these areas have different network performance characteristics (area 401: low, area 402: medium, area 403: high). The five VMs 110-1 . . . 5 are assumed to have different network load profiles. For example, between VMs 110-1 and 110-2 there is little network load, between VMs 110-2 and 110-3 and between VMs 110-5 and 110-3 there is heavy network load, and between VMs 110-2 and 110-5 and between VMs 110-3 and 110-4 there is medium network load.

By collecting and evaluating the VM communication profiles, the profile collector and evaluator functions 51, 61, 51', 61', 51", and 61" of the three network areas 401, 402, 403 can identify the strong communication partners (110-2, 110-3, 110-5) and co-locate them in the network area 403 which can be a special high performance area which is capable of or optimized for handling high network load. Further, in order not to exceed the resources of area 403, VM 110-4 is moved to area 402.

In detail, the evaluation process may consist of the following steps: Check VM profiles and identify those with strong network throughput (value exceeds corresponding configuration variable, predetermined threshold figure); for each VM, check if there are strong data flows into other network areas; If yes, check if there is an area which exceeds a relative maximum (value exceeds corresponding configuration variable, predetermined threshold figure), e.g. at least 60% of the VM's total network flow data are sent to a single area; If yes, identify the profile evaluator function of this area; Inform the profile evaluator function about possible re-location candidate and its current hardware resource demand (CPU and memory); If not enough resources are available in the remote area, the remote profile evaluator function may check if it's possible to move machines with low network activity away in order to free up more resources for the re-location candidate; If enough resources could be offered, the local profile evaluator function starts evaluation of the re-location cost function; if a cost function returns a positive result, contact the hypervisor and trigger movement of the VM.

Figure 6:
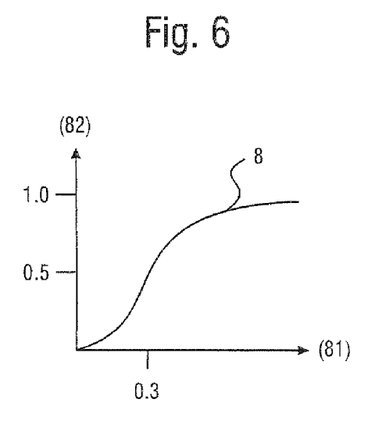
FIG. 6 shows a schematic view of a so-called "S-curve".

An example of the above-mentioned cost function is shown in FIG. 6, being a function evaluating factors which may support or discourage from re-location of a VM. The cost function 8 as shown in FIG. 6 depicts for the network load 81 (e.g. current load/maximum load=300 Mbit/s/1000 Mbit/s=0.3) a value 82 in the range of 0 to 1. Also moving costs of a re-location action can be considered. The following tables show a list of factors supporting (positive weights) or discouraging (negative weights) from VM re-location. The evaluation of a factor may involve a non-linear evaluation function. For instance, an S-curve function could be more applicable to certain factors.

The cost function can be evaluated as a sum of weighted factors: Each factor is calculated by division of a profile variable with its reference value (see below table), yielding a result in the range [0 . . . 1]. Afterwards the factor can be further evaluated with an evaluation function (see FIG. 6), still yielding a result between [0 . . . 1]. Finally the result is multiplied with the factor's weight and taken as a summand for the evaluation function.

| Profile variable | Reference value | Weight | Evaluation Function |
|---|---|---|---|
| Network Load | Max. System Load | +10 | S-Curve |
| CPU Load | Max. System Load | −5 | Linear |
| Disk load | Preconfigured Threshold | −5 | Linear |
| Time since last re-location | Preconfigured Threshold | −5 | Reciprocal |

Also predefined attributes may be assigned to virtual machines, which can be read by the profile creator (function) and evaluated by the profile evaluator (function) in the cost function as well: These factors can be flags (value=0 or 1) or attribute ranges. They are evaluated and summed like the profile factors in the cost function as described above.

| Variable | Reference value | Weight | Evaluation Function |
|---|---|---|---|
| Stable latency desired (flag) | 1 | +5 | Linear |
| Critical time range for VM re-location downtime | Critical time range | −5 | Linear |

If the cost function gives a positive result, re-location of the VM to the other network area may improve the system performance. The next step is to contact the hypervisor and trigger the re-location. In general, for each network area its details can be evaluated with a separate cost function.

Figure 4:
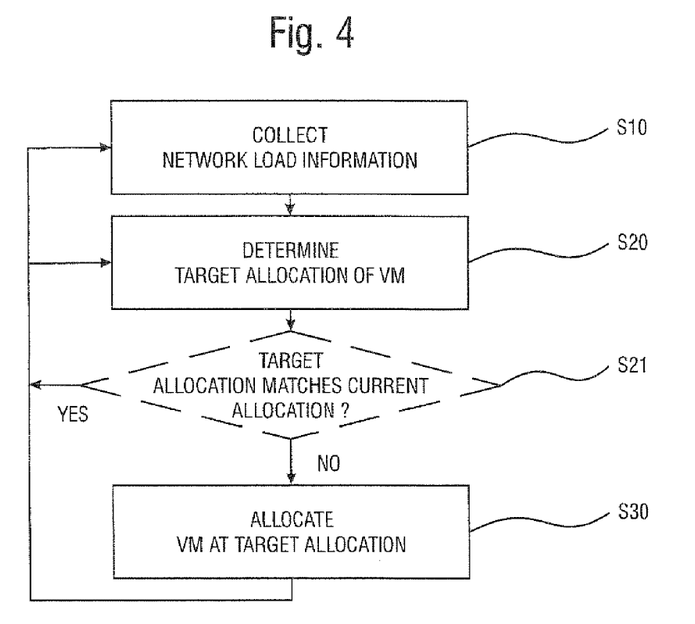
FIG. 4 shows a flowchart of a method embodiment of the present invention.

FIG. 4 shows a flowchart of a method embodiment of the present invention. According to this embodiment, the method is for operating a datacenter and comprises at least the steps of collecting S10 network load information indicating a load of the network; determining S20 a target allocation of one of the virtual machines at one of the hosts based on the collected network load information; and allocating S30 the one virtual machine at the one host based on the determined target allocation.

As an optional step, there may be decided in step S21 whether or not the target allocation determined in step S20 matches a current location. If so, (i.e. "YES"), no re-location may be necessary so that the method continues to collect network load information and/or determine a target allocation of a VM, i.e. either returns to step S10 or S20. If it is determined in step S20 that the target allocation does not match a current location (i.e. "NO"), allocation/re-location may become necessary and the method continues with step S30. In each case, the method may be performed continuously, or in intervals, so that the method returns to step S10 or S20 after step S21 (case "YES") or step S30.

Figure 5:
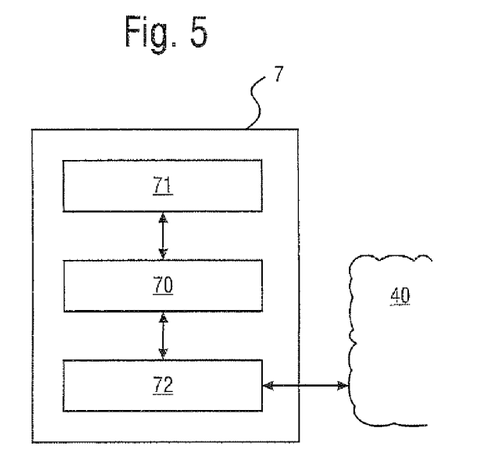
FIG. 5 shows a schematic view of a datacenter entity according to an embodiment of the present invention.

FIG. 5 shows a schematic view of a datacenter entity according to an embodiment of the present invention. Accordingly, a datacenter entity 7 comprises a processing unit 70, a memory 71, and a communication interface 72. In said memory 71 there may be stored code so as to configure the processing unit 70 to generate a network load profile based on network load information indicating load of a network coupling a plurality of hosts and to determine a target allocation of a virtual machine at one of the hosts based on the network load profile. For this purpose, the datacenter entity 7 comprises the communication interface 72 for exchanging data with other entities and/or hosts of a datacenter via network 40.

According to other embodiments of the present invention, the profile evaluation function can also be used to determine the network and computation activity of a VM. If activity indicators such as CPU usage and network load stay below a predefined threshold for a predefined amount of time, the VM can be considered unused/idle. If an energy efficient operation of the VM is desired, the profile evaluator may ask the corresponding hypervisor to suspend this machine. Resuming of the machine can be triggered by existing Wake-on-LAN mechanisms or by predefined timers.

According to other embodiments of the present invention, all current hypervisors may offer interfaces for external management software. These interfaces can be used to trigger actions such as re-location of virtual machines. As input they need the ID of the virtual machine and the destination where the VM should be moved to. The ID can be found with the help of the hypervisor by the network address of a VM.

According to other embodiments of the present invention, the disclosed profiling mechanism can be used to dynamically identify machines with high network load and their communication partners. With a temporal pattern recognition algorithm it can also be used to learn and predict communication behaviour between systems from previous observations (e.g. system backups scheduled during night).

Embodiments of the present invention may allow for improving system performance for virtual machines in computing environments where areas with different network performance characteristics can be used. This does not necessarily require special high performance network infrastructure. Also normal hosts which allow co-location of virtual machines are an area which provides higher network performance (e.g. by enabling co-located VMs to communicate over their host's internal high speed system bus). Thus even in datacenters with homogeneous network infrastructure between hosts, many high performance network areas exist and may be used to improve overall network performance between virtual machines.

In contrast to conventional VM schedulers, the present invention provides a method for finding the optimal placement (allocation) for VMs from a network performance perspective. This may be especially advantageous for distributed systems where the network load of machines is not equally distributed and/or is changing during runtime. Examples for these systems are: Telecom core networks where inhomogeneous communication affinity between multiple nodes can be found due to System affinities: certain node groups (e.g. MSC and HLR) need to communicate more often than others (e.g. BSC and HLR), and/or due to user affinities: certain users communicate more often within a certain group than with others (e.g. because of geographical locations, spatial and/or temporal events like social events, sport events or emergency situations like earthquakes); In distributed systems, where nodes show communication affinities with other nodes, like: a database which needs to update its records with the help of other nodes (e.g. from varying large data sources); a backup server which is creating system backups of other nodes; a web server which is providing files or streams that are located on another system (e.g. file or streaming server).

Generally speaking, conventional solutions do not take heterogeneous network conditions into account, where some areas of the network offer higher performance than the rest. One could also think of a network consisting of two or more areas with different hardware capabilities, e.g. area A is equipped with standard 1 Gbit/s hardware while area B has 40 Gbit/s high-speed hardware. In order to use the hardware capabilities optimally, one should move VM's with high network load into area B. Also co-location of VM's onto one host means placing them into a (virtual) area which offers higher network performance. It doesn't matter, however, if a real or virtual high performance area is available.

Measurements have shown that network I/O performance between co-located VM's can be much higher and more stable as compared to VM's connected over a network (which has a certain hard limit, e.g. 1 Gbit/s). This effect can be explained by faster communication over the internal system bus. The impact of the effect may depend on the difference between internal and external bus speeds.

In order to find a VM/host mapping which offers optimal performance for network data flows, network communication profiles of VMs are created and evaluated to find communication groups which would benefit from co-location.

With the preceding embodiments explained, one can see that the placement of VMs can have an enormous impact on the network performance of systems or applications running inside VMs. If communication intensive VMs are placed on the same host, they can benefit from the mentioned network performance gain of co-located machines.

Although detailed embodiments have been described, these only serve to provide a better understanding of the invention defining by the independent claims, and are not be seen as limiting.

The invention claimed is:

1. A method of operating a datacenter comprising a plurality of hosts coupled by a network, the hosts being configurable to run a plurality of virtual machines wherein a first host of the plurality of hosts is configured to run a first virtual machine of the plurality of virtual machines, the method comprising:
   collecting network load information indicating a load of the network;
   creating a stored network history profile for the first virtual machine of the plurality of virtual machines based on the collected network load information and storing said stored network history profile;
   selecting a second virtual machine of the plurality of virtual machines as a master virtual machine;
   determining, by the master virtual machine, a target allocation of the first virtual machine at a second host based on a comparison of a last profile sequence of the first virtual machine to the stored network history profile to predict a future behavior of the first virtual machine; and
   allocating the first virtual machine at the second host based on the determined target allocation.

2. The method of claim 1, further comprising:
   defining at least one communication group in the datacenter, said communication group comprising at least one host;
   wherein said communication group comprises an area of the network, said area coupling a group of hosts of said datacenter.

3. The method of claim 1, further comprising:
   defining at least one communication group in the datacenter, said communication group comprising at least one host;
   generating a network load profile from the network load information; and
   determining the target allocation based on evaluation of the network load profile.

4. The method of claim 3, wherein the network load profile is generated for each of said at least one communication group.

5. The method of claim 4, wherein there are at least two of the communication groups, the method further comprising:
cooperatively collecting a plurality of network load profiles from each of the communication groups; and
determining the target allocation based on the plurality of network load profiles.

6. The method of claim 1, wherein the determining of the target allocation comprises considering available resources of the datacenter, further comprising:
collecting additional load indicator information for considering the available resources of the datacenter.

7. The method of claim 1, wherein the determining of the target allocation comprises calculating and evaluating a cost function.

8. The method of claim 1, wherein the comparison of the last profile sequence of the virtual machine to the stored network history profile to predict a future behavior of the virtual machine comprises:
applying pattern recognition of previously observed patterns in the stored network history profile to patterns in the last profile sequence to predict the future behavior of the virtual machine.

9. The method of claim 1, wherein determining the target allocation of the first virtual machine at the second host comprises determining a target re-location of the first virtual machine from the first host to the second host, and wherein allocating the first virtual machine comprises re-locating the first virtual machine from the first host to the second host, wherein the first and second hosts are first and second host computers that are separate.

10. The method of claim 9, wherein the first host is in a first network area, wherein the second host is in a second network area, wherein determining comprising determining the target re-location based on communication between the first virtual machine at the first host and a third virtual machine in the second network area.

11. A datacenter entity operating in a datacenter comprising a plurality of hosts coupled by a network, the hosts being configurable to run a plurality of virtual machines wherein a first host of the plurality of hosts is configured to run a first virtual machine of the plurality of virtual machines, the datacenter entity comprising:
a processing unit; and
a memory coupled to the processing unit and comprising computer readable program code that when executed by the processor causes the processor to perform operations comprising:
generating a network load profile based on network load information indicating load of a network coupling a plurality of hosts;
creating a stored network history profile for the first virtual machine of the plurality of virtual machines based on the network load information and storing said stored network history profile;
selecting, a second virtual machine of the plurality of virtual machines as a master virtual machine;
determining a target allocation of the first virtual machine at a second host based on a comparison of a last profile sequence of the first virtual machine to the stored network history profile to predict a future behavior of the first virtual machine; and
allocating the first virtual machine at the second host based on the determined target allocation.

12. The datacenter entity of claim 11, said processing unit being further configured to perform operations comprising:
receiving said network load information for generating said network load profile from one of the plurality of hosts.

13. The datacenter entity of claim 11, said processing unit being further configured to perform operations comprising:
receiving said network load information for generating said network load profile from a network node of said network.

14. The datacenter entity of claim 11, said processing unit being further configured to perform operations comprising:
exchanging said network load profile with a further datacenter entity.

15. The datacenter entity of claim 11, said processing unit being further configured to perform operations comprising:
considering available resources of the datacenter to determine the target allocation of the virtual machine at the one of the hosts.

16. The datacenter entity of claim 15, said processing unit being further configured to perform operations comprising:
collecting additional load indicator information for considering the available resources of the datacenter to determine the target allocation of the virtual machine at the one of the hosts.

17. The datacenter entity of claim 11, said processing unit being further configured to perform operations comprising:
calculating and evaluate a cost function to determine the target allocation of the virtual machine at the one of the hosts.

18. The datacenter entity of claim 11, wherein determining the target allocation of the first virtual machine at the first host comprises determining a target re-location of the first virtual machine from the first host to the second host, and wherein allocating the first virtual machine comprises re-locating the first virtual machine from the first host to the second host, wherein the first and second hosts are first and second host computers that are separate.

19. The method of claim 18, wherein the first host is in a first network area, wherein the second host is in a second network area, wherein determining comprising determining the target re-location based on communication between the first virtual machine at the first host and a third virtual machine in the second network area.

20. A system for use in at least one datacenter comprising a plurality of hosts coupled by a network, the system comprising a datacenter entity as set out by claim 11 and at least one collecting entity configured to collect said network load information.

* * * * *

UNITED STATES PATENT AND TRADEMARK OFFICE
CERTIFICATE OF CORRECTION

PATENT NO. : 9,807,159 B2
APPLICATION NO. : 14/119600
DATED : October 31, 2017
INVENTOR(S) : Ingo Grothues Page 1 of 2

It is certified that error appears in the above-identified patent and that said Letters Patent is hereby corrected as shown below:

On the Title Page

In Item (57), under "ABSTRACT", in Column 2, Lines 5-6, delete "virtu machines" and insert -- virtual machines --, therefor.

In the Drawings

In Fig. 5, Sheet 5 of 5, delete " " and insert -- --, therefor.

In the Specification

In Column 1, Line 54, delete "applications" and insert -- applications. --, therefor.

In Column 1, Line 66, delete "may be communicate" and insert -- may communicate --, therefor.

In Column 2, Line 61, delete "understanding the" and insert -- understanding of the --, therefor.

In Column 3, Line 29, delete "(OS) In" and insert -- (OS) 120-1 . . . n. In --, therefor.

In Column 3, Line 33, delete "VM Examples" and insert -- VM 110-1 . . . n. Examples --, therefor.

In Column 3, Line 66, delete "in introduced." and insert -- is introduced. --, therefor.

In Column 4, Line 20, delete "capabilities'," and insert -- capabilities, --, therefor.

Signed and Sealed this
Twenty-eighth Day of May, 2019

Andrei Iancu
*Director of the United States Patent and Trademark Office*

CERTIFICATE OF CORRECTION (continued)
U.S. Pat. No. 9,807,159 B2

In Column 4, Line 38, delete "other the profile" and insert -- other profile --, therefor.

In Column 4, Line 45, delete "resources 101," and insert -- resources 100, --, therefor.

In Column 6, Line 4, delete "hypervisors 101', 101", and 101"," and insert -- hypervisors 101, 101', and 101", --, therefor.

In Column 6, Line 13, delete "invention, The" and insert -- invention, the --, therefor.

In Column 6, Line 30, delete "an other values" and insert -- an other value --, therefor.

In Column 10, Line 24, delete "defining by" and insert -- defined by --, therefor.

In the Claims

In Column 10, Line 30, in Claim 1, delete "virtual machines" and insert -- virtual machines, --, therefor.

In Column 11, Line 40, in Claim 11, delete "virtual machines" and insert -- virtual machines, --, therefor.

In Column 12, Line 35, in Claim 17, delete "and evaluate" and insert -- and evaluating --, therefor.

In Column 12, Line 46, in Claim 19, delete "The method of claim 18," and insert -- The datacenter entity of claim 18, --, therefor.